United States Patent
Li et al.

(10) Patent No.: US 12,493,499 B2
(45) Date of Patent: Dec. 9, 2025

(54) TASK UNLOADING METHOD BASED ON UNMANNED AERIAL VEHICLE COOPERATION

(71) Applicant: CHONGQING UNIVERSITY OF POSTS AND TELECOMMUNICATIONS, Chongqing (CN)

(72) Inventors: Yun Li, Chongqing (CN); Feibo Hu, Chongqing (CN); Junnan Pan, Chongqing (CN); Yunfeng Jiang, Chongqing (CN); Ziliang Liu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/685,243

(22) PCT Filed: Aug. 1, 2023

(86) PCT No.: PCT/CN2023/110510
§ 371 (c)(1),
(2) Date: Feb. 21, 2024

(87) PCT Pub. No.: WO2025/010774
PCT Pub. Date: Jan. 16, 2025

(65) Prior Publication Data
US 2025/0238281 A1      Jul. 24, 2025

(30) Foreign Application Priority Data
Jul. 11, 2023   (CN) .......................... 202310842568.7

(51) Int. Cl.
*G06F 9/50*      (2006.01)
*G06F 9/48*      (2006.01)

(52) U.S. Cl.
CPC .......... *G06F 9/5083* (2013.01); *G06F 9/4875* (2013.01); *G06F 9/5094* (2013.01)

(58) Field of Classification Search
CPC .... G06F 9/5083; G06F 9/4875; G06F 9/5094; B64U 2201/00
See application file for complete search history.

(56) References Cited

U.S. PATENT DOCUMENTS

| | | | | |
|---|---|---|---|---|
| 8,510,743 | B2* | 8/2013 | Hackborn | G06F 9/5022 715/764 |
| 8,959,321 | B1* | 2/2015 | Annan | G06F 9/445 711/170 |

(Continued)

FOREIGN PATENT DOCUMENTS

| | | | | |
|---|---|---|---|---|
| CN | 111988792 A | * | 11/2020 | G06F 30/20 |
| CN | 113254095 A | * | 8/2021 | G06F 9/44594 |

(Continued)

OTHER PUBLICATIONS

International Search Report for PCT/CN2023/110510 mailed Nov. 3, 2023, ISA/CN.

*Primary Examiner* — James R Sheleheda
(74) *Attorney, Agent, or Firm* — Yue (Robert) Xu; Apex Attorneys at Law, LLP

(57) ABSTRACT

A task unloading method based on unmanned aerial vehicle cooperation is provided. The method includes: establishing an unmanned aerial vehicle cooperation task unloading system; establishing, for each of ground users, a local task unloading model of the ground user; establishing, for each of the ground users, an unmanned aerial vehicle task unloading model of the ground user; establishing a hovering model of the unmanned aerial vehicles; and calculating an optimal (Continued)

task unloading assignment solution by using a second price auction algorithm to perform task unloading. With the method, task unloading is performed based on unmanned aerial vehicle mobile edge computing, improving the quality of service and the service experience of the users.

10 Claims, 4 Drawing Sheets

(56) References Cited

U.S. PATENT DOCUMENTS

| | | | |
|---|---|---|---|
| 11,294,702 B2* | 4/2022 | Krasner | G06F 9/5027 |
| 11,412,061 B1 | 8/2022 | Guo et al. | |
| 12,223,336 B2* | 2/2025 | Zhao | G06N 3/092 |
| 2009/0204963 A1* | 8/2009 | Swart | G06F 9/5022 |
| | | | 718/1 |
| 2016/0170849 A1* | 6/2016 | Cheng | G06F 11/203 |
| | | | 714/11 |
| 2018/0081694 A1* | 3/2018 | Dipol | G06F 9/485 |
| 2019/0272224 A1* | 9/2019 | Woods | G06F 11/3006 |
| 2020/0394053 A1* | 12/2020 | Jain | G06F 8/65 |
| 2021/0007023 A1* | 1/2021 | Umapathy | H04W 36/0061 |
| 2021/0075730 A1* | 3/2021 | Palermo | H04L 47/125 |
| 2022/0050725 A1* | 2/2022 | Gehrling | G06F 9/5038 |
| 2023/0169838 A1 | 6/2023 | Kim et al. | |
| 2024/0086254 A1* | 3/2024 | Abhishek | G06F 9/5072 |
| 2024/0403072 A1* | 12/2024 | Okada | G06F 9/5022 |

FOREIGN PATENT DOCUMENTS

| | | | | |
|---|---|---|---|---|
| CN | 113378369 A | | 9/2021 | |
| CN | 114125708 A | * | 3/2022 | ......... G06F 18/2321 |
| CN | 114513814 A | * | 5/2022 | ............ H04W 24/02 |
| CN | 114520991 A | * | 5/2022 | |
| CN | 114630397 A | * | 6/2022 | ......... H04B 7/18504 |
| CN | 114650567 A | * | 6/2022 | ......... H04W 28/0835 |
| CN | 114844555 A | * | 8/2022 | |
| CN | 115002725 A | * | 9/2022 | |
| CN | 115100623 A | * | 9/2022 | ............... G06N 3/08 |
| CN | 115175250 A | | 10/2022 | |
| CN | 114520768 B | * | 5/2023 | |
| CN | 116669109 A | * | 8/2023 | ........ H04W 28/0917 |
| CN | 116841646 A | | 10/2023 | |
| CN | 113741999 B | * | 3/2024 | ......... G06F 9/44594 |
| CN | 117715117 A | * | 3/2024 | |
| CN | 119828735 A | * | 4/2025 | |
| KR | 20230094893 A | * | 6/2023 | |
| WO | 2019126807 A1 | | 6/2019 | |
| WO | WO-2020263374 A1 | * | 12/2020 | .......... G06F 11/3442 |
| WO | WO-2024174426 A1 | * | 8/2024 | ............. H04L 41/16 |
| WO | WO-2024230352 A1 | * | 11/2024 | ........... G06F 9/5027 |
| WO | WO-2024254892 A1 | * | 12/2024 | ........... G06F 9/5061 |
| WO | WO-2025010774 A1 | * | 1/2025 | ........... G06F 9/5094 |

* cited by examiner

TASK UNLOADING METHOD BASED ON UNMANNED AERIAL VEHICLE COOPERATION

The present application is the national phase of International Patent Application No. PCT/CN2023/110510, titled "TASK UNLOADING METHOD BASED ON UNMANNED AERIAL VEHICLE COOPERATION", filed on Aug. 1, 2023, which claims priority to Chinese Patent Application No. 202310842568.7, titled "TASK UNLOADING METHOD BASED ON UNMANNED AERIAL VEHICLE COOPERATION", filed on Jul. 11, 2023 with the China National Intellectual Property Administration, both of which are incorporated herein by reference in their entireties.

FIELD

The present disclosure relates to the field of unmanned aerial vehicles, and in particular to a task unloading method based on unmanned aerial vehicle cooperation.

BACKGROUND

Unmanned aerial vehicles have the features of fast deployment, high flexibility, strong adaptability, strong functionality and low cost, and thus have great application prospects in wireless communication systems, cellular networks, and other fields. The unmanned aerial vehicle may serve as relay communication and flight mobile terminals, providing great assistance in assisting communication and improving network capacity. Mobile edge computing (MEC) is a technology for computing task resources at an edge. Based on the MEC technology, resource intensive and delay sensitive tasks may be processed, improving service experience of the users and quality of service (QoS). Therefore, the MEC technology is widely applied in fields such as Internet of vehicles, artificial intelligence, and Internet of things.

Unmanned aerial vehicle mobile edge computing is a combination of unmanned aerial vehicle and mobile edge computing. That is, a mobile edge server is installed on an unmanned aerial vehicle, integrating the advantages of the unmanned aerial vehicle and the mobile edge computing. Based on the unmanned aerial vehicle mobile edge computing, line-of-sight links can be established with ground users (GUs), and complex and delay sensitive tasks can be processed in real time.

For a scenario of task unloading of ground users in remote areas, due to sparse population and lack of basic communication devices in the remote areas (such as deserts and plateaus), communication using unmanned aerial vehicles plays a more advantageous role compared to the communication using ground basic devices. With the communication using the unmanned aerial vehicles, the problem of low unloading efficiency of the users can be solved in time, and the quality of service and channel gain of communications can be improved by fully utilizing the advantages of low cost and high mobility of the unmanned aerial vehicles. However, in the communication based on unmanned aerial vehicles, the energy consumption of the unmanned aerial vehicles and task unloading delay are crucial influencing factors. In recent years, many researches are performed for optimizing the energy consumption of the unmanned aerial vehicles, the task unloading delay, or a weighted sum of the energy consumption of the unmanned aerial vehicles and the unloading delay. In the researches, it is not considered how to motivate the ground users to unload tasks to the unmanned aerial vehicles. In appropriate cases, tasks are transferred to the unmanned aerial vehicles for unloading. In inappropriate cases, tasks are unloaded locally. Moreover, in most of the researches, task assignment to multiple unmanned aerial vehicles and multiple ground users is not considered. With appropriate task assignment, the benefits of the unmanned aerial vehicle edge computing system can be maximized.

SUMMARY

A task unloading method based on unmanned aerial vehicle cooperation is provided according to the present disclosure, to improve the efficiency of task unloading for the users in remote areas and appropriately assign task unloading to unmanned aerial vehicles and ground users. The method includes:

step S1: establishing an unmanned aerial vehicle cooperation task unloading system, where the system includes $M=\{1, \ldots m \ldots, M\}$ ground users and $N=\{1, \ldots n \ldots, N\}$ unmanned aerial vehicles, each of the unmanned aerial vehicles is arranged with a mobile edge computing (MEC) server, and a ground user generates a to-be-unloaded task in a case that the ground user directly communicates with an unmanned aerial vehicle;

step S2: establishing, for each of the ground users, a local task unloading model for the ground user based on the number of CPU cycles that the ground user is able to execute per unit time, the number of CPU cycles of the task, a data size of the task and a tolerable delay of the task;

step S3: establishing, for each of the ground users, an unmanned aerial vehicle task unloading model for the ground user based on a transmission power of the ground user, the number of CPU cycles that an MEC server of an original unmanned aerial vehicle is able to execute per unit time, the number of CPU cycles that an MEC server of a cooperative unmanned aerial vehicle is able to execute per unit time, the number of the CPU cycles of the task, the data size of the task and the tolerable delay of the task, where the original unmanned aerial vehicle directly communicates with the ground user, and the cooperative unmanned aerial vehicle indirectly communicates with the ground user;

step S4: establishing a hovering model for the unmanned aerial vehicles based on a hovering power and a hovering delay of the unmanned aerial vehicles; and step S5: calculating an optimal task unloading assignment solution by using a second price auction algorithm based on local task unloading models of the ground users, unmanned aerial vehicle task unloading models of the ground users and the hovering model of the unmanned aerial vehicles to perform task unloading.

In an embodiment, the local task unloading model of the ground user includes:

$$\Omega_{m,n}^t = \{d_{m,n}^t, c_{m,n}^t, \Gamma_{m,n}^t\}$$

$$D_{m,n,t}^{loc} = \frac{c_{m,n}^t}{f_m}, D_{m,n,t}^{loc} \leq \Gamma_{m,n}^t$$

$$E_{m,n,t}^{loc} = k_m c_{m,n}^t f_m^2, E_{m,n,t}^{loc} \leq L_m^t$$

where $\Omega_{m,n}{}^t$ represents a task generated by a ground user m directly communicating with an unmanned aerial vehicle n at a time instant t, $d_{m,n}{}^t$ represents a data size of the task $\Omega_{m,n}{}^t$, $c_{m,n}{}^t$ represents the number of CPU cycles of the task $\Omega_{m,n}{}^t$, $\Gamma_{m,n}{}^t$ represents a tolerable delay of the task $\Omega_{m,n}{}^t$, $D_{m,n,t}{}^{loc}$ represents a time delay for unloading the task $\Omega_{m,n}{}^t$ locally, $E_{m,n,t}{}^{loc}$ represents an energy consumption for unloading the task $\Omega_{m,n}{}^t$ locally, $f_m$ represents the number of CPU cycles that the ground user m is able to execute per unit time, $k_m$ represents an effective capacitance coefficient of the ground user m, $L_m{}^t$ represents a battery capacity of the ground user, and $\Gamma_{m,n}{}^t$ represents the tolerable delay of the task $\Omega_{m,n}{}^t$.

In an embodiment, the establishing, for each of the ground users, an unmanned aerial vehicle task unloading model for the ground user includes:

step S31: calculating an uplink transmission speed of the ground user to the original unmanned aerial vehicle based on the transmission power of the ground user by using the following equation:

$$R_{m,n}^t = \omega \log_2\left(1 + \frac{p_m g_{m,n}^t}{n_0 + P_{int\,erf}}\right)$$

where $\omega$ represents a channel bandwidth, $n_0$ represents a noise power, $p_m$ represents a transmission power of the ground user m, $P_{int\,erf}$ represents a maximum received average interference power, $g_{m,n}{}^t$ represents a channel gain between the ground user m and the original unmanned aerial vehicle n, $R_{m,n}{}^t$ represents an uplink transmission speed of the ground user m to the original unmanned aerial vehicle n;

step S32: calculating a time delay and an energy consumption of unloading the task on the original unmanned aerial vehicle and calculating a time delay and an energy consumption of unloading the task on the cooperative unmanned aerial vehicle based on the uplink transmission speed of the ground user to the original unmanned aerial vehicle, the number of the CPU cycles that the MEC server of the original unmanned aerial vehicle is able to execute per unit time, the number of the CPU cycles that the MEC server on the cooperative unmanned aerial vehicle is able to execute per unit time, the data size of the task, and the tolerable delay of the task by using the following equations:

$$D_{m,n,t}^{ori} = \frac{d_{m,n}^t}{R_{m,n}^t} + D_{m,n,t}^q + \frac{c_{m,n}^t}{F_n}, F_n > f_m, \forall\, m \in M, \forall\, n \in N$$

$$D_{m,n,t}^{coo} = \frac{d_{m,n}^t}{R_{m,n}^t} + \frac{d_{m,n}^t}{R_{m,h}^t} + D_{m,h,t}^q + \frac{c_{m,n}^t}{F_h}$$

$$E_{m,n,t}^{ori} = k_n \times c_{m,n}^t \times f_m^2$$

$$E_{m,n,t}^{coo} = p_n \times \frac{d_{m,n}^t}{R_{n,h}^t} + k_h \times c_{m,n}^t \times f_m^2$$

$$E_{m,n,t}^{trans} = p_m \times \frac{d_{m,n}^t}{R_{m,n}^t}$$

where $D_{m,n,t}{}^{ori}$ represents a time delay of unloading the task $\Omega_{m,n}{}^t$ on the original unmanned aerial vehicle n, $D_{m,n,t}{}^q$ represents a queuing delay for the ground user m unloading a task on the original unmanned aerial vehicle n, $D_{m,n,t}{}^{coo}$ represents a time delay of unloading the task $\Omega_{m,n}{}^t$ on a cooperative unmanned aerial vehicle h, $R_{n,h}{}^t$ represents a transmission speed between the original unmanned aerial vehicle n and the cooperative unmanned aerial vehicle h, $D_{m,h,t}{}^q$ represents a queuing delay for the ground user m unloading a task on the cooperative unmanned aerial vehicle h, $F_n$ represents the number of CPU cycles that an MEC server of the original unmanned aerial vehicle n is able to execute per unit time, $F_h$ represents the number of CPU cycles that an MEC server of the cooperative unmanned aerial vehicle h is able to execute per unit time, $k_n$ represents an effective capacitance coefficient of the original unmanned aerial vehicle n, $k_h$ represents an effective capacitance coefficient of the cooperative unmanned aerial vehicle h, $p_n$ represents a transmission power of the original unmanned aerial vehicle n, $E_{m,n,t}{}^{coo}$ represents an energy consumption of unloading the task $\Omega_{m,n}{}^t$ on the cooperative unmanned aerial vehicle h, $E_{m,n,t}{}^{ori}$ represents an energy consumption of unloading the task $\Omega_{m,n}{}^t$ on the original unmanned aerial vehicle n, and $E_{m,n,t}{}^{trans}$ represent an uplink transmission energy consumption of the ground user m uploading the task $\Omega_{m,n}{}^t$ to the unmanned aerial vehicle n; and step S33: establishing the unmanned aerial vehicle task unloading model for the ground user based on the time delay and the energy consumption of unloading the task on the original unmanned aerial vehicle and the time delay and the energy consumption of unloading the task on the cooperative unmanned aerial vehicle by using the following equations:

$$D_{m,n,t}^{edg} = (1 - b_m^t) \times D_{m,n,t}^{ori} + b_m^t \times D_{m,n,t}^{coo}$$

$$E_{m,n,t}^{edg} = (1 - b_m^t) \times E_{m,n,t}^{ori} + b_m^t \times E_{m,n,t}^{coo}$$

where $D_{m,n,t}{}^{edg}$ represents a total time delay of unloading the task $\Omega_{m,n}{}^t$ on the original unmanned aerial vehicle and unloading the task $\Omega_{m,n}{}^t$ on the cooperative unmanned aerial vehicle; $E_{m,n,t}{}^{edg}$ represents a total energy consumption of unloading the task $\Omega_{m,n}{}^t$ on the original unmanned aerial vehicle and unloading the task $\Omega_{m,n}{}^t$ on the cooperative unmanned aerial vehicle; $b_m{}^t$ represents an actual processing position parameter of the task $\Omega_{m,n}{}^t$, $b_m{}^t \in \{0,1\}$, $b_m{}^t=1$ indicates that the task $\Omega_{m,n}{}^t$ is unloaded on the cooperative unmanned aerial vehicle, and $b_m{}^t=0$ indicates that the task $\Omega_{m,n}{}^t$ is unloaded on the original unmanned aerial vehicle.

In an embodiment, the hovering model for the unmanned aerial vehicles includes:

$$E^N = P_0 \cdot T'$$

where $P_0$ represents the hovering power of the unmanned aerial vehicles, $T'$ represents the hovering delay of the unmanned aerial vehicles, and $E^N$ represents a hovering energy consumption of the unmanned aerial vehicles.

In an embodiment, the calculating an optimal task unloading assignment solution by using a second price auction algorithm to perform task unloading includes:

step S51: for each of the unmanned aerial vehicles, determining the unmanned aerial vehicle as a seller, and determining ground users, directly communicating with the unmanned aerial vehicle, as buyers;

for each of the ground users, calculating a minimum requesting price of the unmanned aerial vehicle for the ground user based on the unmanned aerial vehicle task unloading model of the ground user, the hovering model of the unmanned aerial vehicle, and the number of times the ground user participates in auctions, and initializing a bidding content of the ground user based on the minimum requesting price of the unmanned aerial vehicle for the ground user, where a bidding content of a ground user includes:

$$B_{m,n}{}^t = \{\theta_{m,n}{}^t, \Omega_{m,n}{}^t\}$$

where $B_{m,n}{}^t$ represents a bidding content of the ground user m; and $\theta_{m,n}{}^t$ represents a minimum requesting price of the unmanned aerial vehicle seller n for the ground user m, that is, an initial bidding price of the ground user m;

step S52: establishing a profit model for the ground users and the unmanned aerial vehicles based on bidding contents of the buyers, the unmanned aerial vehicle task unloading models of the ground users, the hovering model of the unmanned aerial vehicles, and the number of times the ground users participate in the auctions;

step S53: for each of the ground users, determining, by the ground user based on a predetermined auction participation condition, whether to participate in a current auction;

determining whether an original unmanned aerial vehicle for the ground user operates in an idle state in a case that the ground user determines to participate in the current auction;

determining a task processing position in a case that the original unmanned aerial vehicle for the ground user operates in the idle state;

determining whether a cooperative unmanned aerial vehicle for the ground user operates in the idle state in a case that the original unmanned aerial vehicle for the ground user does not operate in the idle state;

determining a task processing position in a case that the cooperative unmanned aerial vehicle for the ground user operates in the idle state; and unloading the task locally in a case that the cooperative unmanned aerial vehicle for the ground user does not operate in the idle state;

where the predetermined auction participation condition includes:

$$s_m^t \times X_{m,n} \leq R, R = H \times \tan\theta$$
$$D_{m,n,t}^{edg} < \Gamma_{m,n}^t < D_{m,n,t}^{loc}$$
$$U_{m,n}^t > 0$$
$$E_{m,n,t}^{trans} < L_m^t < E_{m,n,t}^{loc}$$
$$U_{m,n}^t > 0$$
$$E_{m,n,t}^{trans} < E_{m,n,t}^{loc} < L_m^t$$
$$U_{m,n}^t > 0$$
$$D_{m,n,t}^{edg} + \tau' < D_{m,n,t}^{loc} < \Gamma_{m,n}^t$$

where $s_m{}^t \times X_{m,n} \leq R$, $s_m{}^t = 1$ indicates that a coverage radius of the unmanned aerial vehicle n should be greater than or equal to a horizontal distance between the ground user m and the unmanned aerial vehicle n when the ground user m and the unmanned aerial vehicle n perform task unloading, $X_{m,n}$ represents the horizontal distance between the ground user m and the original unmanned aerial vehicle n, H represents a height of the unmanned aerial vehicle from the ground, and $\theta$ represents a fixed beam width between the unmanned aerial vehicle and the ground user;

step S54: establishing a profit optimization model of the unmanned aerial vehicle cooperation task unloading system based on task processing positions of the ground users, the profit model of the ground users and the unmanned aerial vehicles for maximizing a total actual profit of all the ground users and all the unmanned aerial vehicles; solving the profit optimization model of the unmanned aerial vehicle cooperation task unloading system to determine an optimal ground user corresponding to each of the unmanned aerial vehicle sellers as a winner to perform task unloading, where other ground users are determined as losers; and determining an actual payment of the ground user winner based on a second payment rule; and step S55: determining, by the ground user losers, bidding prices for a next auction; determining, by the ground user winner, the actual payment as a bidding price for the next auction; and performing steps S53 to S55.

In an embodiment, for each of the ground users, the minimum requesting price of the unmanned aerial vehicle for the ground user is expressed as:

$$\theta_{m,n}^t = \frac{\gamma_E \times (E_{m,n,t}^{coo} + E^N) + \gamma_C \times (c_{m,n}^t / F_n)}{C_{m,n}^t}$$

where $\theta_{m,n}{}^t$ represents a minimum requesting price of an unmanned aerial vehicle seller n for the ground user m, that is, an initial bidding price of the ground user m; $\gamma_E$ represents an economic cost per unit energy consumption; $\gamma_C$ represents an economic cost per unit time; $\tau'$ represents a time duration of an auction; and $z_m{}^t$ represents the number of times the ground user m participates in auctions.

In an embodiment, the profit model for the ground users and the unmanned aerial vehicles includes:

$$U_{m,n}^t = \gamma_E \times (E_{m,n,t}^{loc} - E_{m,n,t}^{trans}) + \gamma_C \times (D_{m,n,t}^{loc} - D_{m,n,t}^{edg} - z_m^t \times \tau') - \eta_m \times \theta_{m,n}^t$$

$$O_{m,n,t}^{edg} = (1 - b_m^t) \times O_{m,n,t}^{ori} + b_m^t \times O_{m,n,t}^{coo}$$

$$O_{m,n,t}^{ori} = \theta_{m,n}^t - \gamma_c \times \left(\frac{c_{m,n}^t}{F_n} + Z_m^t \tau'\right) - \gamma_E \times (E_{m,n,t}^{ori} + E^N)$$

$$O_{m,n,t}^{coo} = \theta_{m,n}^t - \gamma_c \times \left(\frac{c_{m,n}^t}{F_h} + Z_m^t \tau'\right) - \gamma_E \times (E_{m,n,t}^{coo} + E^N)$$

where $U_{m,n}{}^t$ represents a profit of the ground user m unloading the task $\Omega_{m,n}{}^t$ of the ground user m on the unmanned aerial vehicle; $O_{m,n,t}^{edg}$ represents a profit of the unmanned aerial vehicle unloading the task $\Omega_{m,n}{}^t$ of the ground user m; and $\eta_m$ represents a weight, and represents a bidding index of the ground user m.

In an embodiment, the profit optimization model of the unmanned aerial vehicle cooperation task unloading system includes:

$$P1: \max_{m,n,t} \lim_{T \to \infty} \frac{1}{T} \sum_{t=0}^{T-1} \sum_{m \in M} \sum_{n \in N} (U_{m,n}^t + I_{m,n}^t O_{m,n,t}^{edg})$$

s.t. C1 – C9

C1: $(1-s_m^t) \times E_{m,n,t}^{loc} + s_m^t \times E_{m,n,t}^{trans} < L_m^t$

C2: $(1-s_m^t) \times D_{m,n,t}^{loc} + s_m^t \times D_{m,n,t}^{edg} < \Gamma_{m,n}^t$ C3: $s_m^t \in \{0,1\}, b_m^t \in \{0,1\}$ C4: $I_{m,n}^t \in \{0,1\}$ C5: $p_m \leq p_m^{max}, p_n \leq p_n^{max}$ C6: $s_m^t \times X_{m,n} \leq R, R = H \times \tan\theta$ C7: $d_{n1,n2} \geq d_{min}$ C8: $Q \times \sum_{m=1}^{M} s_m^t \leq N \times n_{max}$ C9: $\sum_{m=1}^{M} I_{m,n}^t \leq N$ where P1 represents an objective optimization function, T represents a total system time slot, $I_{m,n}^t=1$ indicates that the unmanned aerial vehicle n establishes a direct communication connection with the ground user m, $I_{m,n}^t=0$ indicates that the unmanned aerial vehicle n does not establish a direct communication connection with the ground user m, C1 represents an energy consumption constraint of the ground users, $s_{m,n}^t=1$ indicates that the task $\Omega_{m,n}^t$ is unloaded on the unmanned aerial vehicle n, the task $\Omega_{m,n}^t$ is not unloaded on the unmanned aerial vehicle n in a cased that $s_{m,n}^t$ is not equal to 1, $E_{m,n,t}^{loc}$ represents an energy consumption of unloading the task $\Omega_{m,n}^t$ locally, $E_{m,n,t}^{trans}$ represents an uplink transmission energy consumption of the ground user m uploading the task $\Omega_{m,n}^t$ to the unmanned aerial vehicle n, C2 represents a time delay constraint of the ground users, C3 represents a task unloading decision and task processing position constraint of the ground users, C4 represents a communication establishment constraint between the ground users and the unmanned aerial vehicles, C5 represents a transmission power constraint of the ground users and a transmission power constraint of the unmanned aerial vehicles, $p_m^{max}$ represents a maximum transmission power of the ground user, $p_n^{max}$ represents a maximum transmission power of the unmanned aerial vehicles, C6 represents a coverage constraint for the ground users and the unmanned aerial vehicles, C7 represents a constraint condition for avoiding collisions between unmanned aerial vehicles, $d_{n1,n2}$ represents a distance between two unmanned aerial vehicles, $d_{min}$ represents a minimum distance between two unmanned aerial vehicles, C8 represents a unloading task maximum number constraint for the unmanned aerial vehicles, Q represents the total number of tasks of the ground users to be unloaded, $n_{max}$ represents the maximum number of processing tasks for each of the unmanned aerial vehicles, and C9 represents a tasks unloading number constraint for the unmanned aerial vehicles in an auction.

In an embodiment, the determining an actual payment of the ground user winner based on a second payment rule includes:

for each of the unmanned aerial vehicles, establishing a set P including bidding prices of all ground users corresponding to the unmanned aerial vehicle, removing the bidding price of the ground user winner and bidding prices greater than the bidding price of the ground user winner from the set P, and determining a maximum bidding price in remaining bidding prices in the set P as the actual payment of the ground user winner.

In an embodiment, the determining, by the ground user losers, bidding prices for a next auction includes:

$$\theta_{m,n}^{t\prime} = \theta_{m,n}^t * \alpha$$

where $1 < \alpha < 2$, and $\theta_{m,n}^{t\prime}$ represents a bidding price of a ground user loser in the next m,n auction.

The present disclosure has at least the following beneficial effects.

In the present disclosure, comprehensively considering practical scenarios in remote areas, a solution for assisting GUs in remote areas to unload tasks based on the unmanned aerial vehicle mobile edge computing is provided. The solution may be applied to complex and variable environments with low population density, providing a wide coverage based on the features of high flexibility, low cost, agility, and compact structure of UAVs. Compared to the base station MEC unloading service, with the solution according to the present disclosure, the unloading service requirements of GUs in a wide coverage can be met, and the QoS of the GUs can be improved.

In addition, a multi-UAV auction algorithm based on MEC is provided according to the present disclosure, motivating the users to communication with unmanned aerial vehicles and then optimizing task assignment for the users. Under the constraints for UAVs, the constraints for transmission powers, energy consumptions and time delays of the GUs, and the like, the UAVs, actual payments of the GUs, willingness for bid, and personal preferences of the GUs are comprehensively considered, thereby maximizing the social welfare of the system while ensuring the authenticity of the auction system.

In the present disclosure, a second price auction algorithm for maximizing a total profit is designed, optimizing the efficiency of the entire system, and ensuring that the auction process can be performed constantly and stably.

DETAILED DESCRIPTION OF THE EMBODIMENTS

The embodiments of the present disclosure are illustrated with specific examples. Those skilled in the art can easily understand other advantages and effects of the present disclosure from the content disclosed in this specification. The present disclosure may be implemented or applied in other different embodiments. Various details in this specification may be modified or changed based on different viewpoints and applications without departing from the spirit of the present disclosure. It should be noted that the drawings in the following embodiments are only used to illustrate the basic concept of the present disclosure. The following embodiments and the features in the embodiments can be combined if no conflict is caused.

A task unloading method based on unmanned aerial vehicle cooperation is designed for the scenario of task unloading requirements of multiple ground users in a remote area. Firstly, a network model of the whole system is designed, and unloading models, an unmanned aerial vehicle hovering model and a profit model are calculated. Then, an objective function is established based on the profit model. The ground users are motivated based on an auction algorithm to unload tasks from the unmanned aerial vehicles. The objective optimization function is solved using a second price auction algorithm based on maximizing a total profit, thereby maximizing the total profit of the whole system while ensuring the performance of the whole auction system.

Figure 1:
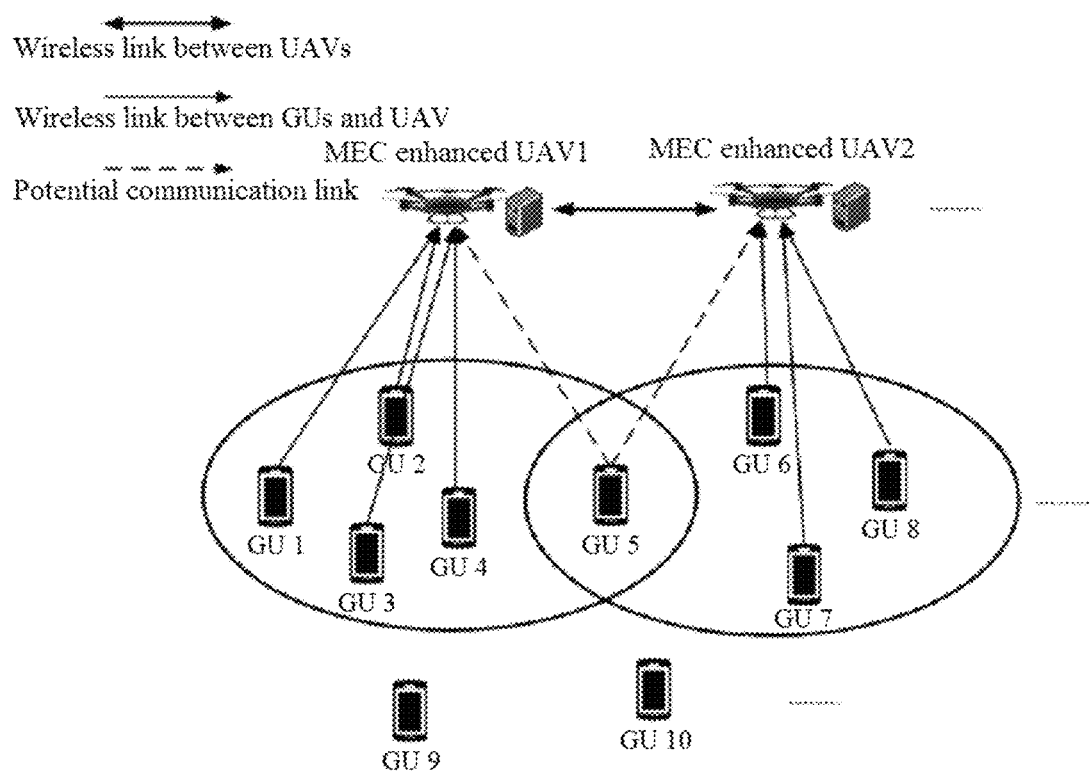
FIG. 1 is a schematic diagram of an unmanned aerial vehicle cooperation task unloading system according to the present disclosure.

As shown in FIG. 1, a task unloading method based on unmanned aerial vehicle cooperation is provided according to the present disclosure. The method includes the following steps S1 to S5.

In step S1, an unmanned aerial vehicle cooperation task unloading system is established. The system includes M={1, ... m ... , M} ground users and N={1, ... n ... , N} unmanned aerial vehicles. Each of the unmanned aerial vehicles is arranged with a mobile edge computing (MEC) server. A ground user, when directly communicating with an unmanned aerial vehicle, generates a to-be-unloaded task.

In step S2, for each of the ground users, a local task unloading model of the ground user is established based on the number of CPU cycles that the ground user can execute per unit time, the number of CPU cycles of the task, a data size of the task, and a tolerable delay of the task.

Further, the local task unloading model of the ground user includes:

$$\Omega_{m,n}^t = \{d_{m,n}^t, c_{m,n}^t, \Gamma_{m,n}^t\}$$

$$D_{m,n,t}^{loc} = \frac{c_{m,n}^t}{f_m}, D_{m,n,t}^{loc} \le \Gamma_{m,n}^t$$

$$E_{m,n,t}^{loc} = k_m c_{m,n}^t f_m^2, E_{m,n,t}^{loc} \le L_m^t$$

where $\Omega_{m,n}^t$ represents a task generated by a ground user m directly communicating with an unmanned aerial vehicle n at a time instant t, $d_{m,n}^t$ represents a data size of the task $\Omega_{m,n}^t$, $c_{m,n}^t$ represents the number of CPU cycles of the task $\Omega_{m,n}^t$, $\Gamma_{m,n}^t$ represents a tolerable delay of the task $\Omega_{m,n}^t$, $D_{m,n,t}^{loc}$ represents a time delay for unloading the task $\Omega_{m,n}^t$ locally, $E_{m,n,t}^{loc}$ represents an energy consumption for unloading the task $\Omega_{m,n}^t$ locally, $E_{m,n,t}^{loc}$ represents the number of CPU cycles that the ground user m is able to execute per unit time, $k_m$ represents an effective capacitance coefficient of the ground user m, $L_m^t$ represents a battery capacity of the ground user, and $\Gamma_{m,n}^t$ represents the tolerable delay of the task $\Omega_{m,n}^t$.

In step S3, for each of the ground users, an unmanned aerial vehicle task unloading model of the ground user is established based on a transmission power of the ground user, the number of CPU cycles that an MEC server on an original unmanned aerial vehicle can execute per unit time, the number of CPU cycles that an MEC server on a cooperative unmanned aerial vehicle can execute per unit time, the number of the CPU cycles of the task, the data size of the task and the tolerable delay of the task. The original unmanned aerial vehicle directly communicates with the ground user, and the cooperative unmanned aerial vehicle indirectly communicates with the ground user.

Further, for each of the ground users, the unmanned aerial vehicle task unloading model of the ground user is established by performing the following steps S31 to S33.

In step S31, an uplink transmission speed of the ground user to the original unmanned aerial vehicle is calculated based on the transmission power of the ground user by using the following equation:

$$R_{m,n}^t = \omega \log_2\left(1 + \frac{p_m g_{m,n}^t}{n_0 + P_{int\,erf}}\right)$$

where ω represents a channel bandwidth, $n_0$ represents a noise power, $p_m$ represents a transmission power of the ground user m, $P_{int\,erf}$ represents a maximum received average interference power, $g_{m,n}^t$ represents a channel gain between the ground user m and the original unmanned aerial vehicle n, $R_{m,n}^t$ represents an uplink transmission speed of the ground user m to the original unmanned aerial vehicle n.

In step S32, a time delay and an energy consumption of unloading the task on the original unmanned aerial vehicle and a time delay and an energy consumption of unloading the task on the cooperative unmanned aerial vehicle are calculated based on the uplink transmission speed of the ground user to the original unmanned aerial vehicle, the number of the CPU cycles that the MEC server on the original unmanned aerial vehicle can execute per unit time, the number of the CPU cycles that the MEC server on the cooperative unmanned aerial vehicle can execute per unit time, the data size of the task, and the tolerable delay of the task by using the following equations:

$$D_{m,n,t}^{ori} = \frac{d_{m,n}^t}{R_{m,n}^t} + D_{m,n,t}^q + \frac{c_{m,n}^t}{F_n}, F_n > f_m, \forall\, m \in M, \forall\, n \in N$$

$$D_{m,n,t}^{coo} = \frac{d_{m,n}^t}{R_{m,n}^t} + \frac{d_{m,n}^t}{R_{m,h}^t} + D_{m,h,t}^q + \frac{c_{m,n}^t}{F_h}$$

$$E_{m,n,t}^{ori} = k_n \times c_{m,n}^t \times f_m^2$$

$$E_{m,n,t}^{coo} = p_n \times \frac{d_{m,n}^t}{R_{n,h}^t} + k_h \times c_{m,n}^t \times f_m^2$$

$$E_{m,n,t}^{trans} = p_m \times \frac{d_{m,n}^t}{R_{m,n}^t}$$

where $D_{m,n,t}^{ori}$ represents a time delay of unloading the task $\Omega_{m,n}^t$ on the original unmanned aerial vehicle n, $D_{m,n,t}^q$ represents a queuing delay for the ground user m unloading a task on the original unmanned aerial vehicle n, $D_{m,n,t}^{coo}$ represents a time delay of unloading the task $\Omega_{m,n}^t$ on a cooperative unmanned aerial vehicle h, $R_{n,h}^t$ represents a transmission speed between the original unmanned aerial vehicle n and the cooperative unmanned aerial vehicle h, $D_{m,h,t}^q$ represents a queuing delay for the ground user m unloading a task on the cooperative unmanned aerial vehicle h, $F_n$ represents the number of CPU cycles that an MEC server of the original unmanned aerial vehicle n is able to execute per unit time, $F_h$ represents the number of CPU cycles that an MEC server of the cooperative unmanned aerial vehicle h is able to execute per unit time, $k_n$ represents an effective capacitance coefficient of the original unmanned aerial vehicle n, $k_h$ represents an effective capacitance coefficient of the cooperative unmanned aerial vehicle h, $p_n$ represents a transmission power of the original unmanned aerial vehicle n, $E_{m,n,t}^{coo}$ represents an energy consumption of unloading the task $\Omega_{m,n}^t$ on the cooperative unmanned aerial vehicle h, $E_{m,n,t}^{ori}$ represents an energy consumption of unloading the task $\Omega_{m,n}^t$ on the original unmanned aerial vehicle n, and $E_{m,n,t}^{trans}$ represent an uplink transmission energy consumption of the ground user m uploading the task $\Omega_{m,n}^t$ to the unmanned aerial vehicle n.

In step S33, the unmanned aerial vehicle task unloading model of the ground user is established based on the time delay and the energy consumption of unloading the task on the original unmanned aerial vehicle and the time delay and the energy consumption of unloading the task on the cooperative unmanned aerial vehicle by using the following equations:

$$D_{m,n,t}^{edg} = (1 - b_m^t) \times D_{m,n,t}^{ori} + b_m^t \times D_{m,n,t}^{coo}$$

$$E_{m,n,t}^{edg} = (1 - b_m^t) \times E_{m,n,t}^{ori} + b_m^t \times E_{m,n,t}^{coo}$$

where $D_{m,n,t}^{edg}$ represents a total time delay of unloading the task $\Omega_{m,n}^t$ on the original unmanned aerial vehicle and unloading the task $\Omega_{m,n}^t$ on the cooperative unmanned aerial vehicle; $E_{m,n,t}^{edg}$ represents a total energy consumption of unloading the task $\Omega_{m,n}^t$ on the original unmanned aerial vehicle and unloading the task $\Omega_{m,n}^t$ on the cooperative unmanned aerial vehicle; $b_m^t$ represents an actual processing position parameter of the task $\Omega_{m,n}^t$, $b_m^t \in \{0,1\}$, $b_m^t = 1$ indicates that the task $\Omega_{m,n}^t$ is unloaded on the cooperative unmanned aerial vehicle, and $b_m^t = 0$ indicates that the task $\Omega_{m,n}^t$ is unloaded on the original unmanned aerial vehicle.

In step S4, a hovering model of the unmanned aerial vehicles is created based on a hovering power and a hovering delay of the unmanned aerial vehicles.

Further, the hovering model of the unmanned aerial vehicles includes:

$$E^N = P_0 \cdot T'$$

where $P_0$ represents the hovering power of the unmanned aerial vehicles, $T'$ represents the hovering delay of the unmanned aerial vehicles, and $E^N$ represents a hovering energy consumption of the unmanned aerial vehicles.

In step S5, an optimal task unloading assignment solution is obtained by using a second price auction algorithm based on local task unloading models of the ground users, unmanned aerial vehicle task unloading models of the ground users and the hovering model of the unmanned aerial vehicles to perform task unloading.

Figure 2:
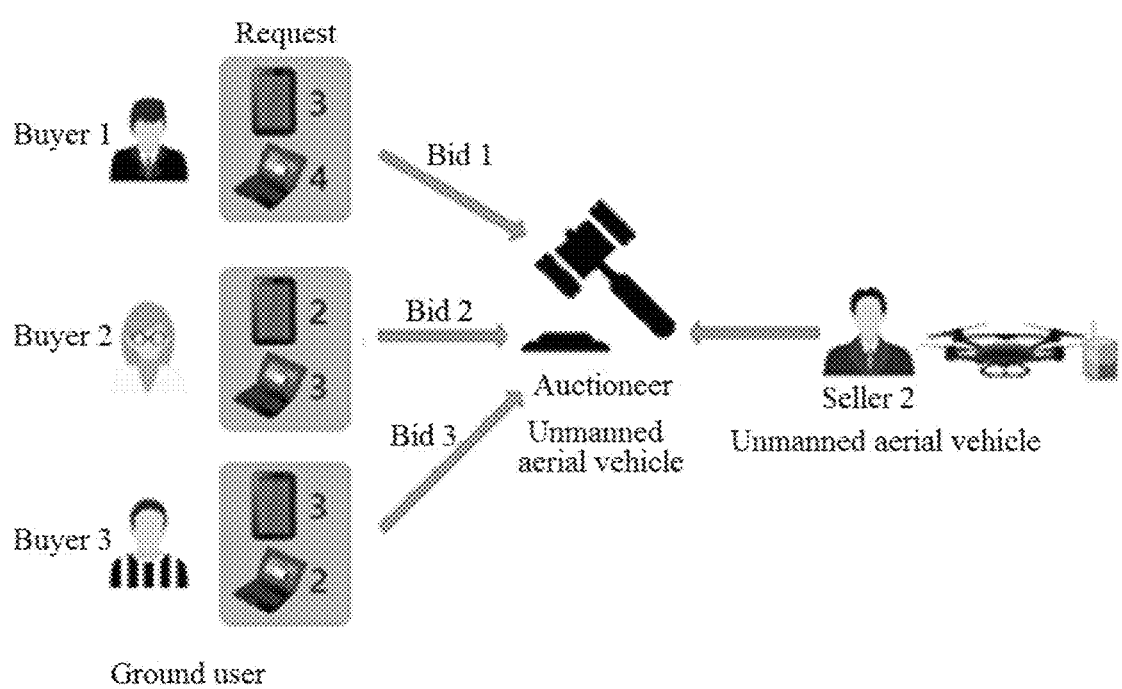
FIG. 2 is a schematic diagram showing role configurations in an auction process according to the present disclosure.
Figure 3:
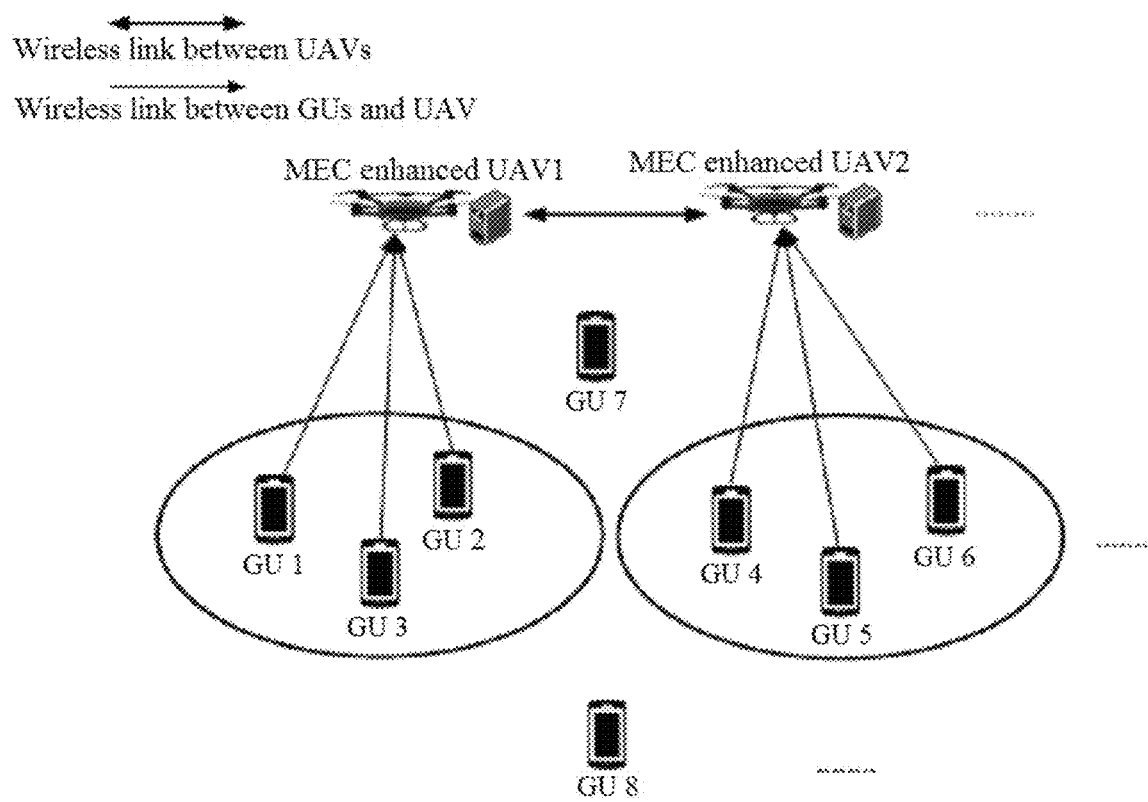
FIG. 3 is a schematic diagram showing a model of an auction system according to the present disclosure.
Figure 4:
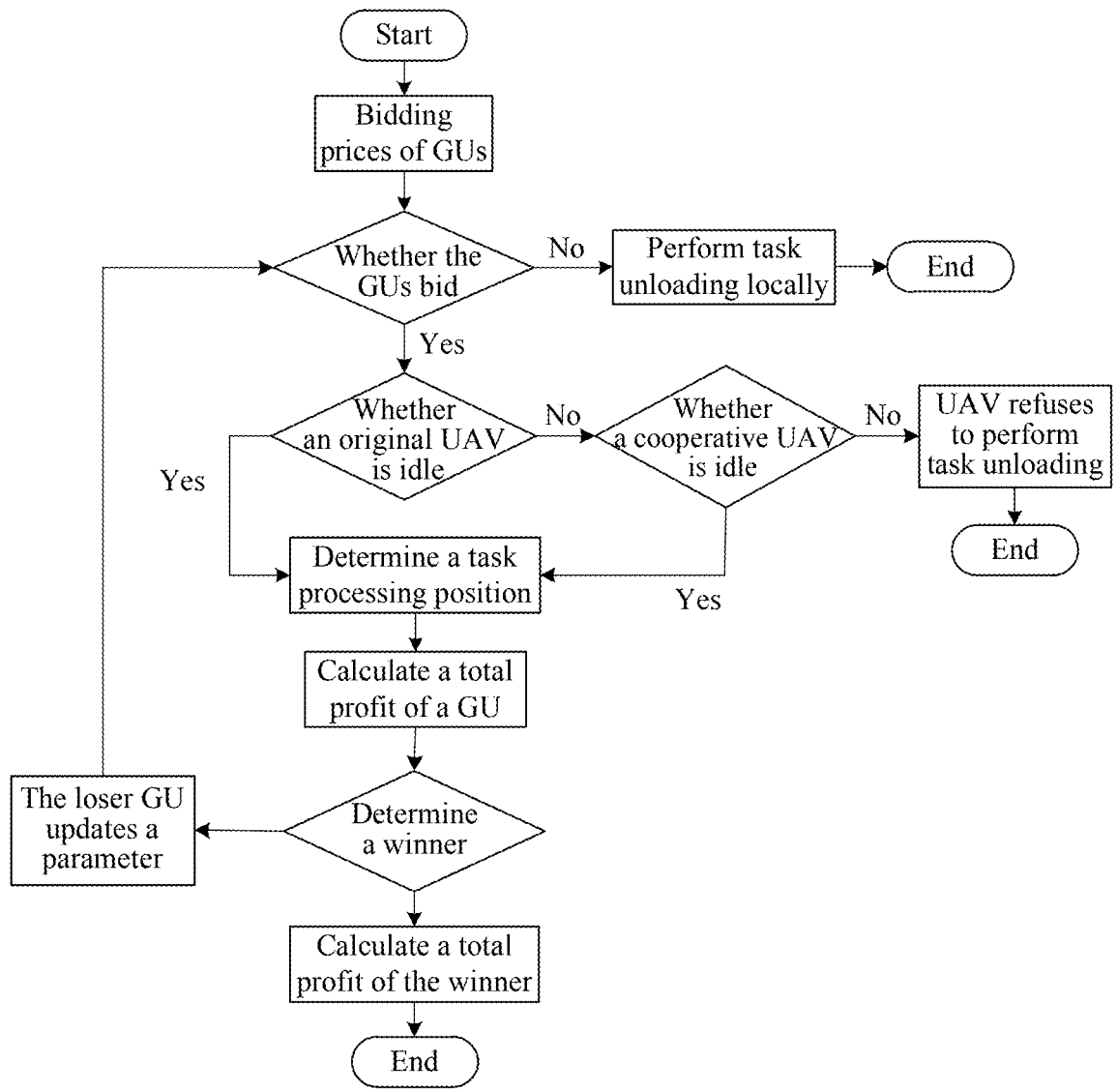
FIG. 4 is a flowchart of an auction process according to the present disclosure.

Referring to FIG. 4, based on the above design objectives, energy consumptions of the unmanned aerial vehicle nodes minimized to extend the endurance of the unmanned aerial vehicles and increase the serve life of the network. In addition, it is required to pay attention to the time delay requirements of the tasks of the ground users. FIG. 2 is a schematic diagram showing role configurations in an auction process according to the present disclosure. As shown in FIG. 3, a model of an unmanned aerial vehicle auction system is established based on the above design objectives. Further, the optimal task unloading assignment solution is calculated by using a second price auction algorithm to perform task unloading by performing the following steps S51 to S55.

In step S51, for each of the unmanned aerial vehicles, the unmanned aerial vehicle is determined as a seller, and ground users directly communicating with the unmanned aerial vehicle are determined as buyers; for each of the ground users, a minimum requesting price of the N unmanned aerial vehicle for the ground user is calculated based on the unmanned aerial vehicle task unloading model of the ground user, the hovering model of the unmanned aerial vehicle and the number of times the ground user participates in auctions, and a bidding content of the ground user is initialized based on the minimum requesting price of the unmanned aerial vehicles for the ground user.

In order to ensure a profit of the unmanned aerial vehicle greater than 0 in an auction process, a minimum bidding price of the ground users may be set as the minimum requesting price of the unmanned aerial vehicle, thereby ensuring that the profit of the unmanned aerial vehicle is positive in a first auction process.

Further, the minimum requesting price of the unmanned aerial vehicle for the ground users is expressed as:

$$\theta_{m,n}^t = \frac{\gamma_E \times (E_{m,n,t}^{coo} + E^N) + \gamma_C \times (c_{m,n}^t / F_n)}{C_{m,n}^t}$$

where $\theta_{m,n}^t$ represents a minimum requesting price of an unmanned aerial vehicle seller n for the ground user m, that is, an initial bidding price of the ground user m; $\gamma_E$ represents an economic cost per unit energy consumption; $\gamma_C$ represents an economic cost per unit time; $\tau'$ represents a time duration of an auction; and $z_m^t$ represents the number of times the ground user m participates in auctions.

Further, a bidding content of a ground user includes:

$$B_{m,n}^t = \{\theta_{m,n}^t, \Omega_{m,n}^t\}$$

where $B_{m,n}^t$ represents a bidding content of the ground user m.

In step S52, a profit model for the ground users and the unmanned aerial vehicles is established based on bidding contents of the buyers, the unmanned aerial vehicle task unloading models of the ground users, the hovering model of the unmanned aerial vehicles, and the number of times the ground users participate in the auctions.

In an embodiment, the profit model for the ground users and the unmanned aerial vehicles includes:

$$U_{m,n}^t = \gamma_E \times (E_{m,n,t}^{loc} - E_{m,n,t}^{trans}) + \gamma_C \times (D_{m,n,t}^{loc} - D_{m,n,t}^{edg} - z_m^t \times \tau') - \eta_m \times \theta_{m,n}^t$$

$$O_{m,n,t}^{edg} = (1 - b_m^t) \times O_{m,n,t}^{ori} + b_m^t \times O_{m,n,t}^{coo}$$

$$O_{m,n,t}^{ori} = \theta_{m,n}^t - \gamma_c \times \left(\frac{c_{m,n}^t}{F_n} + Z_m^t \tau'\right) - \gamma_E \times (E_{m,n,t}^{ori} + E^N)$$

$$O_{m,n,t}^{coo} = \theta_{m,n}^t - \gamma_c \times \left(\frac{c_{m,n}^t}{F_h} + Z_m^t \tau'\right) - \gamma_E \times (E_{m,n,t}^{coo} + E^N)$$

where $U_{m,n}^t$ represents a profit of the ground user m unloading the task $\Omega_{m,n}^t$ of the ground user m on the unmanned aerial vehicle; $O_{m,n,t}^{edg}$ represents a profit of the unmanned aerial vehicle unloading the task $\Omega_{m,n}^t$ of the ground user m; and $\eta_m$ represents a weight, and represents a bidding index of the ground user m.

Before the unmanned aerial vehicles and the ground users participate in the auction, requesting prices of the unmanned aerial vehicles and the bidding prices of the ground users are initialized, to ensure that the bidding prices of the ground users are always greater than the initial requesting prices of the unmanned aerial vehicles in the auctions. In order to ensure that a profit of an unmanned aerial vehicle is greater than 0, the unloading cost of the unmanned aerial vehicle may be set equal to a minimum requesting price of the unmanned aerial vehicle, thereby ensuring that the profit of the unmanned aerial vehicle is always positive in an auction process.

In step S53, for each of the ground users, the ground user determines whether to participate in a current auction based on a predetermined auction participation condition. In a case that the ground user determines to participate in the current auction, it is determined whether an original unmanned aerial vehicle for the ground user operates in an idle state. In a case that the original unmanned aerial vehicle for the ground user operates in the idle state, a task processing position is determined. In a case that the original unmanned aerial vehicle for the ground user does not operate in the idle state, it is determined whether a cooperative unmanned aerial vehicle for the ground user operates in the idle state. In a case that the cooperative unmanned aerial vehicle for the ground user operates in the idle state, a task processing position is determined. In a case that the cooperative unmanned aerial vehicle for the ground user does not operate in the idle state, the task is unloaded locally. The predetermined auction participation condition includes:

$$s_m^t \times X_{m,n} \leq R, R = H \times \tan\theta$$

$$D_{m,n,t}^{edg} < \Gamma_{m,n} < D_{m,n,t}^{loc}$$

$$U_{m,n}^t > 0$$

$$E_{m,n,t}^{trans} < L_m^t < E_{m,n,t}^{loc}$$

$$U_{m,n}^t > 0$$

$$E_{m,n,t}^{trans} < E_{m,n,t}^{loc} < L_m^t$$

$$U_{m,n}^t > 0$$

$$D_{m,n,t}^{edg} + \tau' < D_{m,n,t}^{loc} < \Gamma_{m,n}$$

where $s_m^t \times X_{m,n} \leq R$, $s_m^t=1$ indicates that a coverage radius of the unmanned aerial vehicle n should be greater than or equal to a horizontal distance between the ground user m and the unmanned aerial vehicle n when the ground user m and the unmanned aerial vehicle n perform task unloading, $X_{m,n}$ represents the horizontal distance between the ground user m and the original unmanned aerial vehicle n, H represents a height of the unmanned aerial vehicle from the ground, and θ represents a fixed beam width between the unmanned aerial vehicle and the ground user.

In step S54, a profit optimization model of the unmanned aerial vehicle cooperation task unloading system is established based on task processing positions of the ground users, the profit model of the ground users and the unmanned aerial vehicles for maximizing a total actual profit of all the ground users and all the unmanned aerial vehicles. The profit optimization model of the unmanned aerial vehicle cooperation task unloading system is solved to determine an optimal ground user corresponding to each of the unmanned aerial vehicle sellers as a winner to perform task unloading. T other ground users are determined as losers. An actual payment of the winner ground user winner is determined based on a second payment rule.

Further, the profit optimization model of the unmanned aerial vehicle cooperation task unloading system includes:

$$P1: \max_{m,n,t} \lim_{T \to \infty} \frac{1}{T} \sum_{t=0}^{T-1} \sum_{m \in M} \sum_{n \in N} (U_{m,n}^t + I_{m,n}^t O_{m,n,t}^{edg})$$

$$\text{s.t. } C1 - C9$$

$$C1: (1-s_m^t) \times E_{m,n,t}^{loc} + s_m^t \times E_{m,n,t}^{trans} < L_m^t$$

$$C2: (1-s_m^t) \times D_{m,n,t}^{loc} + s_m^t \times D_{m,n,t}^{edg} < \Gamma_{m,n}$$

$$C3: s_m^t \in \{0,1\}, b_m^t \in \{0,1\}$$

$$C4: I_{m,n}^t \in \{0,1\}$$

$$C5: p_m \leq p_m^{max}, p_n \leq p_n^{max}$$

$$C6: s_m^t \times X_{m,n} \leq R, R = H \times \tan\theta$$

$$C7: d_{n1,n2} \geq d_{min}$$

$$C8: Q \times \sum_{m=1}^{M} s_m^t \leq N \times n_{max}$$

$$C9: \sum_{m=1}^{M} I_{m,n}^t \leq N$$

where P1 represents an objective optimization function, T represents a total system time slot, $I_{m,n}^t=1$ indicates that the unmanned aerial vehicle n establishes a direct communication connection with the ground user m, $I_{m,n}^t=0$ indicates that the unmanned aerial vehicle n does not establish a direct communication connection with the ground user m, C1 represents an energy consumption constraint of the ground users, $s_{m,n}^t=1$ indicates that the task $\Omega_{m,n}^t$ is unloaded on the unmanned aerial vehicle n, the task $\Omega_{m,n}^t$ is not unloaded on the unmanned aerial vehicle n in a cased that $s_{m,n}^t$ is not equal to 1, $E_{m,n,t}^{loc}$ represents an energy consumption of unloading the task $\Omega_{m,n}^t$ locally, $E_{m,n,t}^{trans}$ represents an uplink transmission energy consumption of the ground user m uploading the task t to the unmanned aerial vehicle n, C2 represents a time delay constraint of the ground users, C3 represents a task unloading decision and task processing position constraint of the ground users, C4 represents a communication establishment constraint between the ground users and the unmanned aerial vehicles, C5 represents a transmission power constraint of the ground users and a transmission power constraint of the unmanned aerial vehicles, $p_m^{max}$ represents a maximum transmission power of the ground user, $p_n^{max}$ represents a maximum transmission power of the unmanned aerial vehicles, C6 represents a coverage constraint for the ground users and the unmanned aerial vehicles, C7 represents a constraint condition for avoiding collisions between unmanned aerial vehicles, $d_{n1,n2}$ represents a distance between two unmanned aerial vehicles, $d_{min}$ represents a minimum distance between two unmanned aerial vehicles, C8 represents a unloading task maximum number constraint for the unmanned aerial vehicles, Q represents the total number of tasks of the ground users to be unloaded, $n_{max}$ represents the maximum number of processing tasks for each of the unmanned aerial vehicles, and C9 represents a tasks unloading number constraint for the unmanned aerial vehicles in an auction.

Further, the actual payment of the ground user winner is determined based on the second payment rule by: for each of the unmanned aerial vehicles, establishing a set P including bidding prices of all ground users corresponding to the unmanned aerial vehicle, removing the bidding price of the ground user winner and bidding prices greater than the bidding price of the ground user winner from the set P, and determining a maximum bidding price in remaining bidding prices in the set P as the actual payment of the ground user winner.

In step S55, the ground user losers determine bidding prices for a next auction, the ground user winner determines the actual payment as a bidding price for the next auction, and then steps S53 to S55 are performed.

Further, the ground user losers determine bidding prices for a next auction by using the following equation:

$$\theta_{m,n}^{t'} = \theta_{m,n}^{t} * \alpha$$

where $1<\alpha<2$, and $\theta_{m,n}^{t'}$ represents a bidding price of a ground user loser in the next auction.

Referring to FIG. 3, a second price auction algorithm based on maximizing a total profit is designed in an embodiment of the present disclosure. FIG. 3 shows a model of an auction system. The process of determining a winner and the payment rule are described as follows.

(1) An unmanned aerial vehicle 1 calculates a minimum requesting price, an unmanned aerial vehicle 2 calculates a minimum requesting price, and ground user 1 to the ground user 6 bid based on the minimum requesting prices of the unmanned aerial vehicles.

(2) The unmanned aerial vehicle 1 calculates a buyer profit of the ground user 1 and a seller profit of the unmanned aerial vehicle 1 based on the bid of the ground user 1, and then performs a sum operation to obtain a total bidding profit of the ground user 1.

(3) The unmanned aerial vehicle 2 calculates a buyer profit of the ground user 4 and a seller profit of the unmanned aerial vehicle 2 based on the bid of the ground user 4, and then performs a sum operation to obtain a total bidding profit of the ground user 4. It should be noted that the unmanned aerial vehicle 1 and the unmanned aerial vehicle 2 perform the above operations in parallel.

(4) The unmanned aerial vehicle 1 calculates a total bidding profit of the ground user 2 and a total bidding profit of the ground user 3. The unmanned aerial vehicle 2 calculates a total bidding profit of the ground user 5 and a total bidding profit of the ground user 6.

(5) Each of the unmanned aerial vehicle 1 and the unmanned aerial vehicle 2 determine a winner in a current auction process based on the calculated total profits. That is, the ground user having a highest total bidding profit is determined as the winner in the current auction process.

(6) The unmanned aerial vehicle 1 sorts bids of the ground user 1 to the ground user 3 in a descending order to obtain a set A1, and the unmanned aerial vehicle 2 sorts bids of the ground user 4 to the ground user 6 in a descending order to obtain a set A2. It is assumed that a bid of the winner determined by the unmanned aerial vehicle 1 is a1 and a bid of the winner determined by the unmanned aerial vehicle 2 is a2.

(7) An actual payment of the ground user winner corresponding to the unmanned aerial vehicle 1 is determined by: removing a1 and a bid higher than a1 from the set A1, and determining a highest bid in the remaining bids in the set A1 as the actual payment of the ground user winner a1. Similarly, an actual payment of the ground user winner a2 corresponding to the unmanned aerial vehicle 2 may be determined.

It should be noted that the embodiments described above are only provided for describing the technical solutions of the present disclosure rather than limiting the technical solutions. Although the present disclosure is described in detail with reference to the preferred embodiments, those skilled in the art should understand that modifications or substitutions may be made to the technical solutions of the present disclosure without departing from the spirit and scope of the present disclosure. The modification or substitutions should fall within the scope of the claims of the present disclosure.

The invention claimed is:

1. A task unloading method based on unmanned aerial vehicle cooperation, comprising:

step S1: establishing an unmanned aerial vehicle cooperation task unloading model, wherein the system comprises M={1, ... m ... ,M} ground users and N={1, ... n ... , N} unmanned aerial vehicles, each of the unmanned aerial vehicles is arranged with a mobile edge computing (MEC) server, and a ground user among the M={1, ... m ... , M} ground users, when directly communicating with among the N={1, ... n ... , N} unmanned aerial vehicles, generates a to-be-unloaded task;

step S2: establishing, for each of the ground users, a local task unloading model for the ground user based on the number of CPU cycles that the ground user is able to execute per unit time, the number of CPU cycles of the to-be-unloaded task, a data size of the to-be-unloaded task and a tolerable delay of the to-be-unloaded task;

step S3: establishing, for each of the ground users, an unmanned aerial vehicle task unloading model for the ground user based on a transmission power of the ground user, the number of CPU cycles that an MEC server of an original unmanned aerial vehicle among the N={1, ... n ... , N} unmanned aerial vehicles is able to execute per unit time, the number of CPU cycles that an MEC server of a cooperative unmanned aerial vehicle among the N={1, ... n ... , N} unmanned aerial vehicles is able to execute per unit time, the number of the CPU cycles of the task, the data size of the task and the tolerable delay of the task, wherein the original unmanned aerial vehicle directly communicates with the ground user, and the cooperative unmanned aerial vehicle indirectly communicates with the ground user;

step S4: establishing a hovering model for the unmanned aerial vehicles based on a hovering power and a hovering delay of the unmanned aerial vehicles; and step S5: calculating an optimal task unloading assignment solution by using a price auction algorithm based on the local task unloading model of each of the ground users, the unmanned aerial vehicle task unloading model of each of the ground users and the hovering model of the unmanned aerial vehicles to perform task unloading.

2. The task unloading method based on unmanned aerial vehicle cooperation according to claim 1, wherein the local task unloading model of each of the ground users comprises:

$$\Omega_{m,n}^t = \{d_{m,n}^t, c_{m,n}^t, \Gamma_{m,n}^t\}$$

$$D_{m,n,t}^{loc} = \frac{c_{m,n}^t}{f_m}, D_{m,n,t}^{loc} \le \Gamma_{m,n}^t$$

$$E_{m,n,t}^{loc} = k_m c_{m,n}^t f_m^2, E_{m,n,t}^{loc} \le L_m^t$$

where $\Omega_{m,n}^t$ represents a task generated by a ground user m directly communicating with an unmanned aerial vehicle n at a time instant t, $d_{m,n}^t$ represents a data size of the task $\Omega_{m,n}^t$, $c_{m,n}^t$ represents the number of CPU cycles of the task $\Omega_{m,n}^t$, $\Gamma_{m,n}^t$ represents a tolerable delay of the task $\Omega_{m,n}^t$, $D_{m,n,t}^{loc}$ represents a time delay for unloading the task $\Omega_{m,n}^t$ locally, $E_{m,n,t}^{loc}$ represents an energy consumption for unloading the task $\Omega_{m,n}^t$ locally, $f_m$ represents the number of CPU cycles that the ground user m is able to execute per unit time, $k_m$ represents an effective capacitance coefficient of the ground user m, $L_m^t$ represents a battery capacity of the ground user, and $\Gamma_{m,n}^t$ represents the tolerable delay of the task $\Omega_{m,n}^t$.

3. The task unloading method based on unmanned aerial vehicle cooperation according to claim 2, wherein the establishing, for each of the ground users, an unmanned aerial vehicle task unloading model for the ground user comprises:

step S31: calculating an uplink transmission speed of the ground user to the original unmanned aerial vehicle based on the transmission power of the ground user by using the following equation:

$$R_{m,n}^t = \omega \log_2\left(1 + \frac{p_m g_{m,n}^t}{n_0 + P_{int\ erf}}\right)$$

where ω represents a channel bandwidth, $n_0$ represents a noise power, $p_m$ represents a transmission power of the ground user m, $P_{int\ erf}$ represents a maximum received average interference power, $g_{m,n}^t$ represents a channel gain between the ground user m and the original unmanned aerial vehicle n, $R_{m,n}^t$ represents an uplink transmission speed of the ground user m to the original unmanned aerial vehicle n;

step S32: calculating a time delay and an energy consumption of unloading the task on the original unmanned aerial vehicle and a time delay and an energy consumption of unloading the task on the cooperative unmanned aerial vehicle based on the uplink transmission speed of the ground user to the original unmanned aerial vehicle, the number of the CPU cycles that the MEC server of the original unmanned aerial vehicle is able to execute per unit time, the number of the CPU cycles that the MEC server on the cooperative unmanned aerial vehicle is able to execute per unit time, the data size of the task, and the tolerable delay of the task by using the following equations:

$$D_{m,n,t}^{ori} = \frac{d_{m,n}^t}{R_{m,n}^t} + D_{m,n,t}^q + \frac{c_{m,n}^t}{F_n}, F_n > f_m, \forall\ m \in M, \forall\ n \in N$$

$$D_{m,n,t}^{coo} = \frac{d_{m,n}^t}{R_{m,n}^t} + \frac{d_{m,n}^t}{R_{n,h}^t} + D_{m,n,t}^q + \frac{c_{m,n}^t}{F_n}$$

$$E_{m,n,t}^{ori} = k_n \times c_{m,n}^t \times f_m^2$$

$$E_{m,n,t}^{coo} = p_n \times \frac{d_{m,n}^t}{R_{n,h}^t} + k_h \times c_{m,n}^t \times f_m^2$$

$$E_{m,n,t}^{trans} = p_m \times \frac{d_{m,n}^t}{R_{m,n}^t}$$

where $D_{m,n,t}^{ori}$ represents a time delay of unloading the task $\Omega_{m,n}^t$ on the original unmanned aerial vehicle n, $D_{m,n,t}^q$ represents a queuing delay for the ground user m unloading a task on the original unmanned aerial vehicle n, $D_{m,n,t}^{coo}$ represents a time delay of unloading the task $\Omega_{m,n}^t$ on a cooperative unmanned aerial vehicle h, $R_{n,h}^t$ represents a transmission speed between the original unmanned aerial vehicle n and the cooperative unmanned aerial vehicle h, $D_{m,h,t}^q$ represents a queuing delay for the ground user m unloading a task on the cooperative unmanned aerial vehicle h, $F_n$ represents the number of CPU cycles that an MEC server of the original unmanned aerial vehicle n is able to execute per unit time, $F_h$ represents the number of CPU cycles that an MEC server of the cooperative unmanned aerial vehicle h is able to execute per unit time, $k_n$ represents an effective capacitance coefficient of the original unmanned aerial vehicle n, $k_h$ represents an effective capacitance coefficient of the cooperative unmanned aerial vehicle h, $p_n$ represents a transmission power of the original unmanned aerial vehicle n, $E_{m,n,t}^{coo}$ represents an energy consumption of unloading the task $\Omega_{m,n}^t$ on the cooperative unmanned aerial vehicle h, $E_{m,n,t}^{ori}$ represents an energy consumption of unloading the task $\Omega_{m,n}^t$ on the original unmanned aerial vehicle n, and $E_{m,n,t}^{trans}$ represent an uplink transmission energy consumption of the ground user m uploading the task $\Omega_{m,n}^t$ to the unmanned aerial vehicle n; and step S33: establishing the unmanned aerial vehicle task unloading model for the ground user based on the time delay and the energy consumption of unloading the task on the original unmanned aerial vehicle and the time delay and the energy consumption of unloading the task on the cooperative unmanned aerial vehicle by using the following equations:

$$D_{m,n,t}^{edg} = (1 - b_m^t) \times D_{m,n,t}^{ori} + b_m^t \times D_{m,n,t}^{coo}$$

$$E_{m,n,t}^{edg} = (1 - b_m^t) \times E_{m,n,t}^{ori} + b_m^t \times E_{m,n,t}^{coo}$$

where $D_{m,n,t}^{edg}$ represents a total time delay of unloading the task $\Omega_{m,n}^t$ on the original unmanned aerial vehicle and unloading the task $\Omega_{m,n}^t$ on the cooperative unmanned aerial vehicle; $E_{m,n,t}^{edg}$ represents a total energy consumption of unloading the task $\Omega_{m,n}^t$ on the original unmanned aerial vehicle and unloading the task $\Omega_{m,n}{}^t$ on the cooperative unmanned aerial vehicle; $b_m{}^t$ represents an actual processing position parameter of the task $\Omega_{m,n}{}^t$, $b_m{}^t \in \{0,1\}$, $b_m{}^t=1$ indicates that the task $\Omega_{m,n}{}^t$ is unloaded on the cooperative unmanned aerial vehicle, and $b_m{}^t=0$ indicates that the task $\Omega_{m,n}{}^t$ is unloaded on the original unmanned aerial vehicle.

4. The task unloading method based on unmanned aerial vehicle cooperation according to claim 3, wherein the hovering model for the unmanned aerial vehicles comprises:

$$E^N = P_0 \cdot T'$$

where $P_0$ represents the hovering power of the unmanned aerial vehicles, T' represents the hovering delay of the unmanned aerial vehicles, and $E^N$ represents a hovering energy consumption of the unmanned aerial vehicles.

5. The task unloading method based on unmanned aerial vehicle cooperation according to claim 4, wherein the calculating an optimal task unloading assignment solution by using a price auction algorithm to perform task unloading comprises:

step S51: for each of the unmanned aerial vehicles, determining the unmanned aerial vehicle as a seller, and determining ground users, among the M= $\{1, \ldots m \ldots, M\}$ ground users and directly communicating with the unmanned aerial vehicle, as buyers;

for each of the M=$\{1, \ldots m \ldots, M\}$ ground users, calculating a minimum requesting price of the unmanned aerial vehicle for the ground user based on the unmanned aerial vehicle task unloading model of the ground user, the hovering model of the unmanned aerial vehicle, and the number of times the ground user participates in auctions, and initializing a bidding content of the ground user based on the minimum requesting price of the unmanned aerial vehicle for the ground user, wherein a bidding content of a ground user comprises:

$$B_{m,n}{}^t = \{\theta_{m,n}{}^t, \Omega_{m,n}{}^t\}$$

where $B_{m,n}{}^t$ represents a bidding content of the ground user m; and $\theta_{m,n}{}^t$ represents a minimum requesting price of the unmanned aerial vehicle seller n for the ground user m, that is, an initial bidding price of the ground user m;

step S52: establishing a profit model for the ground users and the unmanned aerial vehicles based on bidding contents of the buyers, the unmanned aerial vehicle task unloading models of the ground users, the hovering model of the unmanned aerial vehicles, and the number of times the ground users participate in the auctions;

step S53: for each of the ground users,
determining, by the ground user based on a predetermined auction participation condition, whether to participate in a current auction;
determining whether an original unmanned aerial vehicle for the ground user operates in an idle state in a case that the ground user determines to participate in the current auction;
determining a task processing position in a case that the original unmanned aerial vehicle for the ground user operates in the idle state;

determining whether a cooperative unmanned aerial vehicle for the ground user operates in the idle state in a case that the original unmanned aerial vehicle for the ground user does not operate in the idle state;
determining a task processing position in a case that the cooperative unmanned aerial vehicle for the ground user operates in the idle state; and
unloading the task locally in a case that the cooperative unmanned aerial vehicle for the ground user does not operate in the idle state;
wherein the predetermined auction participation condition comprises:

$$s_m^t \times X_{m,n} \leq R, R = H \times \tan\theta$$
$$D_{m,n,t}^{edg} < \Gamma_{m,n}^t < D_{m,n,t}^{loc}$$
$$U_{m,n}^t > 0$$
$$E_{m,n,t}^{trans} < L_m^t < E_{m,n,t}^{loc}$$
$$U^t > 0$$
$$E_{m,n,t}^{trans} < E_{m,n,t}^{loc} < L_m^t$$
$$U_{m,n}^t > 0$$
$$D_{m,n,t}^{edg} + \tau' < D_{m,n,t}^{loc} < \Gamma_{m,n}^t$$

where $s_m^t \times X_{m,n} \leq R, s_m^t=1$ indicates that a coverage radius of the unmanned aerial vehicle n should be greater than or equal to a horizontal distance between the ground user m and the unmanned aerial vehicle n when the ground user m and the unmanned aerial vehicle n perform task unloading, $X_{m,n}$ represents the horizontal distance between the ground user m and the original unmanned aerial vehicle n, H represents a height of the unmanned aerial vehicle from the ground, and $\theta$ represents a fixed beam width between the unmanned aerial vehicle and the ground user;

step S54: establishing a profit optimization model of the unmanned aerial vehicle cooperation task unloading model based on task processing positions of the ground users, the profit model of the ground users and the unmanned aerial vehicles for maximizing a total actual profit of all the ground users and all the unmanned aerial vehicles; solving the profit optimization model of the unmanned aerial vehicle cooperation task unloading model to determine an optimal ground user corresponding to each of the unmanned aerial vehicle sellers as a winner to perform task unloading, wherein other ground users are determined as losers; and determining an actual payment of the ground user winner based on a payment rule; and step S55: determining, by the ground user losers, bidding prices for a next auction; determining, by the ground user winner, the actual payment as a bidding price for the next auction; and performing steps S53 to S55.

6. The task unloading method based on unmanned aerial vehicle cooperation according to claim 5, wherein the minimum requesting price of the unmanned aerial vehicle for the ground users is expressed as:

$$\theta_{m,n}^t = \frac{\gamma_E \times \left(E_{m,n,t}^{coo} + E^N\right) + \gamma_C \times \left(c_{m,n}^t / F_n\right)}{C_{m,c}^t}$$

where $\theta_{m,n}{}^t$ represents a minimum requesting price of an unmanned aerial vehicle seller n for the ground user m, that is, an initial bidding price of the ground user m; $\gamma_E$ represents an economic cost per unit energy consumption; $\gamma_C$ represents an economic cost per unit time; $\tau'$ represents a time duration of an auction; and $z_m{}^t$ represents the number of times the ground user m participates in auctions.

7. The task unloading method based on unmanned aerial vehicle cooperation according to claim 6, wherein the profit model for the ground users and the unmanned aerial vehicles comprises:

$$U_{m,n}^t = \gamma_E \times (E_{m,n,t}^{loc} - E_{m,n,t}^{trans}) + \gamma_C \times (D_{m,n,t}^{loc} - D_{m,n,t}^{edg} - z_m^t \times \tau') - \eta_m \times \theta_{m,n}^t$$

$$O_{m,n,t}^{edg} = (1 - b_m^t) \times O_{m,n,t}^{ori} + b_m^t \times O_{m,n,t}^{coo}$$

$$O_{m,n,t}^{ori} = \theta_{m,n}^t - \gamma_c \times \left(\frac{c_{m,n}^t}{F_n} + Z_m^t \tau'\right) - \gamma_E \times (E_{m,n,t}^{ori} + E^N)$$

$$O_{m,n,t}^{coo} = \theta_{m,n}^t - \gamma_c \times \left(\frac{c_{m,n}^t}{F_h} + Z_m^t \tau'\right) - \gamma_E \times (E_{m,n,t}^{coo} + E^N)$$

where $U_{m,n}{}^t$ represents a profit of the ground user m unloading the task $\Omega_{m,n}{}^t$ of the ground user m on the unmanned aerial vehicle; $O_{m,n,t}{}^{edg}$ represents a profit of the unmanned aerial vehicle unloading the task $\Omega_{m,n}{}^t$ of the ground user m; and $\eta_m$ represents a weight, and represents a bidding index of the ground user m.

8. The task unloading method based on unmanned aerial vehicle cooperation according to claim 7, wherein the profit optimization model of the unmanned aerial vehicle cooperation task unloading model comprises:

$$P1: \max_{m,n,t} \lim_{T \to \infty} \frac{1}{T} \sum_{t=0}^{T-1} \sum_{m \in M} \sum_{n \in N} (U_{m,n}^t + I_{m,n}^t O_{m,n,t}^{edg})$$

$$\text{s.t. } C1 - C9$$

$$C1: (1 - s_m^t) \times E_{m,n,t}^{loc} + s_m^t \times E_{m,n,t}^{trans} < L_m^t$$

$$C2: (1 - s_m^t) \times D_{m,n,t}^{loc} + s_m^t \times D_{m,n,t}^{edg} < \Gamma_{m,n}^t$$

$$C3: s_m^t \in \{0, 1\}, b_m^t \in \{0, 1\}$$

$$C4: I_{m,n}^t \in \{0, 1\}$$

$$C5: p_m \leq p_m^{max}, p_n \leq p_n^{max}$$

$$C6: s_m^t \times X_{m,n} \leq R, R = H \times \tan\theta$$

$$C7: d_{n1,n2} \geq d_{min}$$

$$C8: Q \times \sum_{m=1}^{M} s_m^t \leq N \times n_{max}$$

$$C9: \sum_{m=1}^{M} I_{m,n}^t \leq N$$

where P1 represents an objective optimization function, T represents a total system time slot, $I_{m,n}{}^t=1$ indicates that the unmanned aerial vehicle n establishes a direct communication connection with the ground user m, $I_{m,n}{}^t=0$ indicates that the unmanned aerial vehicle n does not establish a direct communication connection with the ground user m, C1 represents an energy consumption constraint of the ground users, $s_{m,n}{}^t=1$ indicates that the task $\Omega_{m,n}{}^t$ is unloaded on the unmanned aerial vehicle n, the task $\Omega_{m,n}{}^t$ is not unloaded on the unmanned aerial vehicle n in a cased that $s_{m,n}{}^t$ is not equal to 1, $E_{m,n,t}{}^{loc}$ represents an energy consumption of unloading the task $\Omega_{m,n}{}^t$ locally, $E_{m,n,t}{}^{trans}$ represents an uplink transmission energy consumption of the ground user m uploading the task $\Omega_{m,n}{}^t$ to the unmanned aerial vehicle n, C2 represents a time delay constraint of the ground users, C3 represents a task unloading decision and task processing position constraint of the ground users, C4 represents a communication establishment constraint between the ground users and the unmanned aerial vehicles, C5 represents a transmission power constraint of the ground users and a transmission power constraint of the unmanned aerial vehicles, $p_m{}^{max}$ represents a maximum transmission power of the ground user, $p_n{}^{max}$ represents a maximum transmission power of the unmanned aerial vehicles, C6 represents a coverage constraint for the ground users and the unmanned aerial vehicles, C7 represents a constraint condition for avoiding collisions between unmanned aerial vehicles, $d_{n1,n2}$ represents a distance between two unmanned aerial vehicles, $d_{min}$ represents a minimum distance between two unmanned aerial vehicles, C8 represents a unloading task maximum number constraint for the unmanned aerial vehicles, Q represents the total number of tasks of the ground users to be unloaded, $n_{max}$ represents the maximum number of processing tasks for each of the unmanned aerial vehicles, and C9 represents a tasks unloading number constraint for the unmanned aerial vehicles in an auction.

9. The task unloading method based on unmanned aerial vehicle cooperation according to claim 5, wherein the determining an actual payment of the ground user winner based on a payment rule comprises:
for each of the unmanned aerial vehicles, establishing a set P comprising bidding prices of all ground users corresponding to the unmanned aerial vehicle, removing the bidding price of the ground user winner and bidding prices greater than the bidding price of the ground user winner from the set P, and determining a maximum bidding price in remaining bidding prices in the set P as the actual payment of the ground user winner.

10. The task unloading method based on unmanned aerial vehicle cooperation according to claim 5, wherein the determining, by the ground user losers, bidding prices for a next auction comprises:

$$\theta_{m,n}^{t'} = \theta_{m,n}^t * \alpha$$

where $1 < \alpha < 2$, and $\theta_{m,n}{}^{t'}$, represents a bidding price of a ground user loser in the next auction.

* * * * *